June 28, 1927.
R. F. CRAWFORD
1,633,806
SELF OILING HUB FOR RADIATOR FANS
Filed Sept. 28, 1925
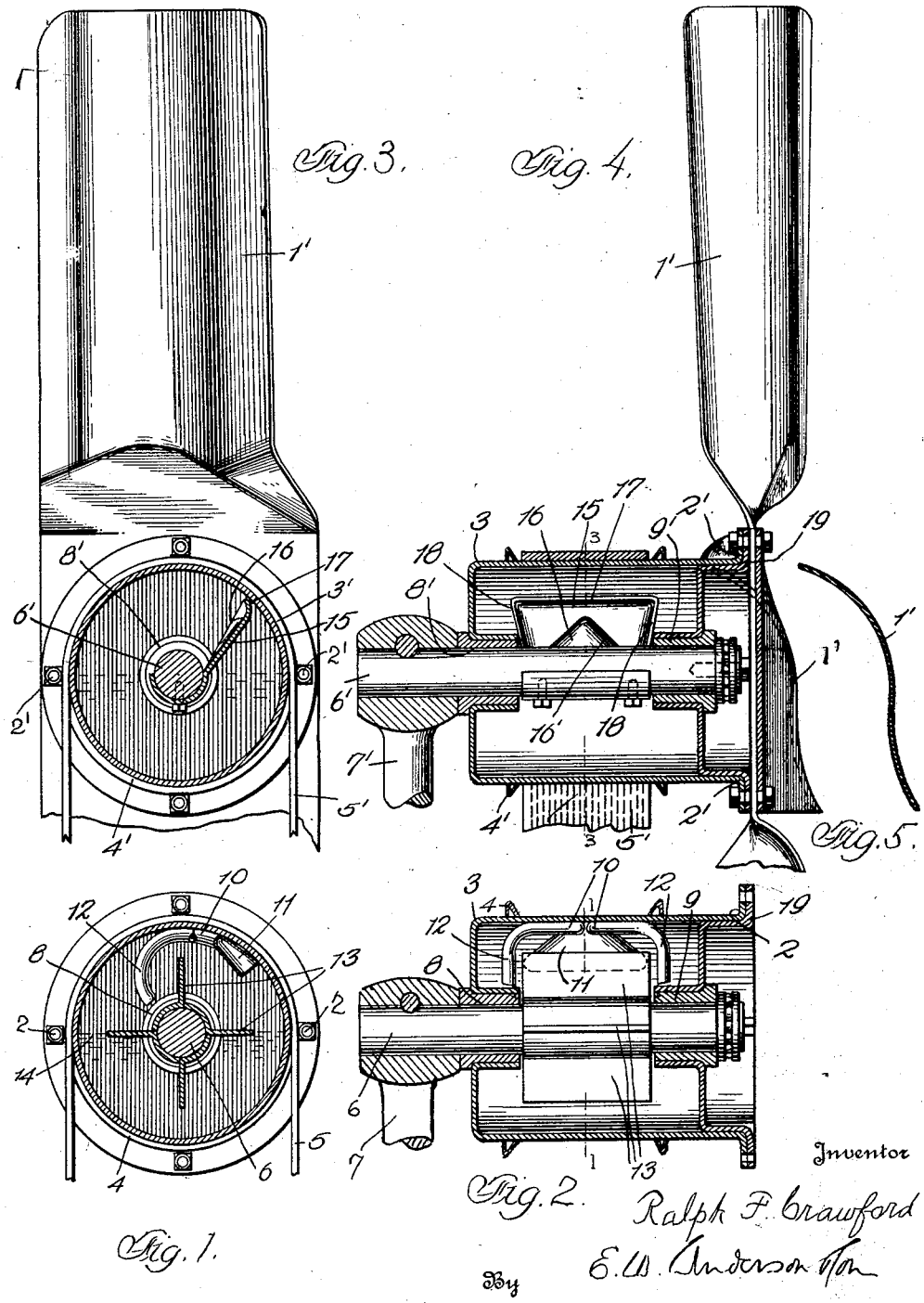
Inventor
Ralph F. Crawford
E. W. Anderson
By
Attorneys Patented June 28, 1927.

1,633,806

UNITED STATES PATENT OFFICE.

RALPH F. CRAWFORD, OF SALINA, KANSAS.

SELF-OILING HUB FOR RADIATOR FANS.

Application filed September 28, 1925. Serial No. 59,087.

The invention has relation to self oiling hubs for radiator fans and other purposes, an object being to provide an improved hub, adapted to automatically circulate the lubricating oil partly filling the same and thrown outwardly by centrifugal force so that the oil will be delivered inwardly to the fan bearing in a constant stream during the rotation of the fan, said oil after such delivery being again thrown outwardly as before. Other objects and advantages will appear hereinafter.

The invention consists in the novel construction and combinations of parts as hereinafter set forth.

In the accompanying drawings illustrating the invention, Figure 1 is a section on the line 1—1, Figure 2, with one of the tubes of the scoop device broken away; Figure 2 is a central longitudinal section of the invention; Figure 3 is a section of a modification of the invention on the line 3—3, Figure 4; Figure 4 is a central longitudinal section of a modification of the invention, showing the fan blades and showing the scoop device in full lines; Figure 5 is a detail transverse section of one of the fan blades.

In these drawings, the numeral 1' designates a radiator fan, bolted at 2 to the hollow hub 3, having an operating pulley 4, whereof the belt is shown at 5, and a stationary shaft 6, supported at one end through arm 7, said hub having spaced annular bearings 8 and 9 upon said shaft.

The lubricating oil partly filling the hollow hub is in the rapid rotation thereof thrown outwardly by centrifugal force so that it circulates annularly around the inner concave superficies or circumferential surface thereof, and means are provided within the hub to deflect the oil and deliver it inwardly to said spaced bearings, consisting of oppositely extending tubes 10, carried by the hub and having funnel shaped mouth 11 located close to the inner circumferential surface of the hub and inwardly extending discharge portions 12, spaced apart and terminating close to the spaced bearings aforesaid.

The shaft 6 is provided with diametric arms 13 located centrally of the discharge portions 12 of said tubes and circumferentially spaced from the inner concave surface of the hub at 14 sufficiently to admit of the funnel shaped inlet portions of said tubes passing through the intervals 14 in the rotation of the hub, the arms 13 causing a damming or hold up of the oil as said inlet portions of the tubes approach each of said arms in the rotation of the hub, said funnel shaped inlet portions acting to scoop up the oil so held up and convey the same inwardly to the aforesaid spaced bearings, said tubes extending in a direction opposite to that of the rotation of the hub as will be seen from Figure 2.

A modification of the invention is shown in Figures 3 and 4 of the drawings wherein the shaft 6' is provided with a stationary deflector 15 having a triangular protuberance 16 centrally thereof, an outer curved wall 17 arched in a direction opposite to that of the rotation of the hub to form a mouth portion to scoop up the oil, and outer curved walls or edges 18 forming with the inclined edge portions 16' of said triangular protuberance, oppositely extending channels leading from said mouth portion and acting to deflect the oil inwardly to said spaced bearings 8' and 9', similar parts having similar reference characters in this modification, differentiated by the exponent 1.

The hub is provided with a forward flange 19, to which the fan is secured. As illustrated this fan is made in accord with the disclosure of Patent No. 1,508,086 of the applicant, but it will be observed that the plane faces of the fan blade have been substituted by curves and that the blades are made with parallel forward and rear edges, whereby increased power is obtained. The hub of the fan may be provided with radial slots, adapted to receive the securing bolts 2 passing through hub flanges 19 of varying diameters.

I claim:—

1. A self oiling hub for radiator fans and the like, consisting of a hollow hub having spaced rotary bearings upon the fan shaft and provided with means for deflecting in opposite directions the oil contained in said hub and delivering the same simultaneously to said spaced bearings including a scoop device having its mouth located centrally of said hub adjacent the concave inner surface of the hub and oppositely extending channels leading from said mouth to and terminating adjacent said spaced bearings.

2. A self oiling hub for radiator fans and the like consisting of a hollow hub having spaced rotary bearings upon the fan shaft and provided with means for deflecting in opposite directions the oil contained in said hub and delivering the same simultaneously to said spaced bearings including a rotary scoop secured to and rotating with the hub with its mouth located centrally and adjacent the concave inner surface thereof and having oppositely extending tubular channels having discharge portions terminating adjacent said spaced bearings, and stationary radial blades carried by the fan shaft between said discharge portions and spaced from the inner concave surface of the hub by an interval sufficient to admit of the passage of the mouth portion of the scoop device.

In testimony whereof I affix my signature.

RALPH F. CRAWFORD.